(12) United States Patent
Uehori et al.

(10) Patent No.: US 8,576,252 B2
(45) Date of Patent: Nov. 5, 2013

(54) INFORMATION DISPLAY APPARATUS, INFORMATION DISPLAYING METHOD, AND COMPUTER READABLE MEDIUM

(75) Inventors: Yukiyo Uehori, Tokyo (JP); Tohru Fuse, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 643 days.

(21) Appl. No.: 12/272,030

(22) Filed: Nov. 17, 2008

(65) Prior Publication Data

US 2009/0315917 A1  Dec. 24, 2009

(30) Foreign Application Priority Data

Jun. 19, 2008 (JP) ................................. 2008-160331

(51) Int. Cl.
*G09G 5/00* (2006.01)

(52) U.S. Cl.
USPC ............................ 345/668; 345/660; 715/246

(58) Field of Classification Search
USPC .......... 345/660, 668, 661; 715/788, 864, 800, 715/802, 246; 382/173
See application file for complete search history.

(56) References Cited

U.S. PATENT DOCUMENTS

| | | | | |
|---|---|---|---|---|
| 7,552,398 | B2 * | 6/2009 | Bier et al. ..................... | 715/800 |
| 2003/0076363 | A1 * | 4/2003 | Murphy ......................... | 345/800 |
| 2004/0223731 | A1 * | 11/2004 | Ozawa et al. .................. | 386/46 |
| 2005/0229111 | A1 * | 10/2005 | Makela ........................ | 715/802 |
| 2006/0050089 | A1 * | 3/2006 | Soroushi ...................... | 345/660 |
| 2007/0040838 | A1 * | 2/2007 | Jeffrey et al. ................. | 345/501 |
| 2007/0047828 | A1 | 3/2007 | Ishii et al. | |
| 2008/0218523 | A1 * | 9/2008 | Zuverink ....................... | 715/788 |
| 2009/0027419 | A1 * | 1/2009 | Kondo et al. .................. | 345/649 |
| 2009/0085936 | A1 * | 4/2009 | Chen et al. .................... | 345/661 |
| 2009/0089704 | A1 * | 4/2009 | Makela ......................... | 715/781 |

FOREIGN PATENT DOCUMENTS

| | | |
|---|---|---|
| CN | 1925544 A | 3/2007 |
| JP | 6-180696 A | 6/1994 |
| JP | 11-234592 A | 8/1999 |
| JP | 2000-172248 A | 6/2000 |
| JP | 2000-305554 A | 11/2000 |
| JP | 2002-324227 A | 11/2002 |
| JP | 2005-84089 A | 3/2005 |
| JP | 2005-267049 A | 9/2005 |
| JP | 2006-295599 A | 10/2006 |
| JP | 2007-047942 A | 2/2007 |

OTHER PUBLICATIONS

Japanese Office Application for Application No. 2008-160331; dated Apr. 20, 2010.

(Continued)

*Primary Examiner* — Chante Harrison
(74) *Attorney, Agent, or Firm* — Sughrue Mion, PLLC

(57) ABSTRACT

An information display apparatus includes: a display portion that displays image information; an acquiring unit that acquires image information being subjected to a display processing; a scale-up and scale-down processing unit that subjects the acquired image information to a scale-up and scale-down processing with a designated scale-up and scale-down ratio; and a deforming unit that compares a size of the image information subjected to the scale-up and scale-down processing with a size of a display area of the display portion, and deforms the image information so that an entirety of the image information is displayed on the display area in a case where the image information is larger than the display area.

14 Claims, 7 Drawing Sheets

(56) References Cited

OTHER PUBLICATIONS

Japanese Office Action issued on Sep. 28, 2010 in the corresponding Japanese Patent Application No. 2008-160331.

Communication dated Apr. 23, 2012 issued by the State Intellectual Property Office of People's Republic of China in Application No. 200910000485.3.

* cited by examiner

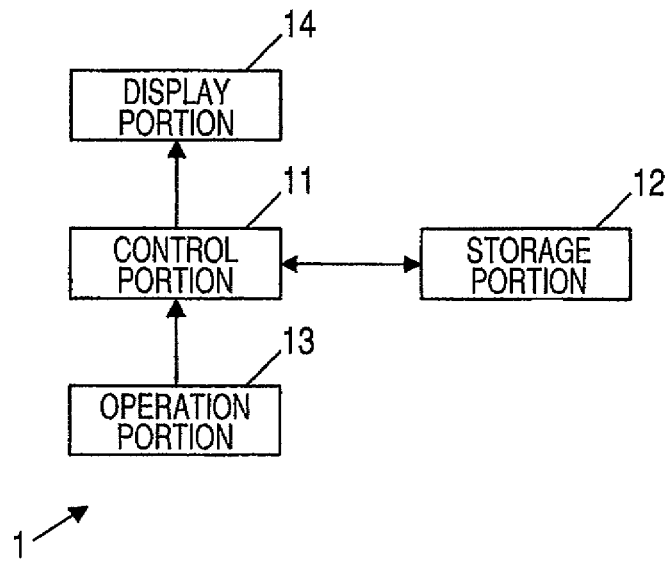

FIG. 8
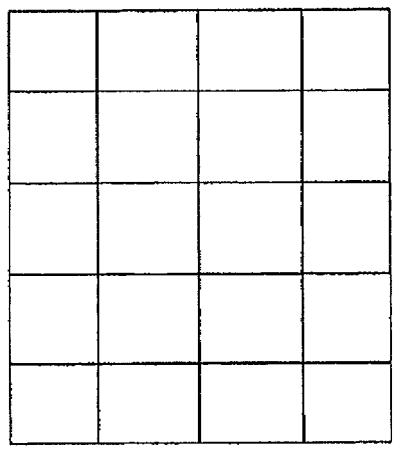
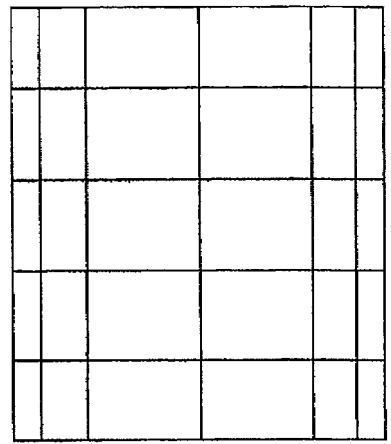
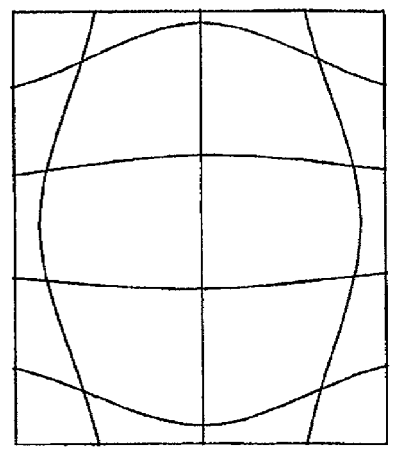

INFORMATION DISPLAY APPARATUS, INFORMATION DISPLAYING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-160331 filed Jun. 19, 2008.

BACKGROUND

1. Technical Field

The present invention relates to an information display apparatus, an information displaying method, and a computer readable medium.

SUMMARY

According to an aspect of the present invention, an information display apparatus includes: a display portion that displays image information; an acquiring unit that acquires image information being subjected to a display processing; a scale-up and scale-down processing unit that subjects the acquired image information to a scale-up and scale-down processing with a designated scale-up and scale-down ratio; and a deforming unit that compares a size of the image information subjected to the scale-up and scale-down processing with a size of a display area of the display portion, and deforms the image information so that an entirety of the image information is displayed on the display area in a case where the image information is larger than the display area.

BRIEF DESCRIPTION OF THE DRAWINGS

Exemplary embodiment of the present invention will be described in detail based on the following figures, wherein:

FIG. 1 is a block diagram showing the configuration of an example of an information display apparatus according to an exemplary embodiment of the invention;

FIG. 2 is an explanatory diagram showing an example of a document which is processed by the information display apparatus according to the exemplary embodiment of the invention;

FIG. 8 is explanatory diagram showing modified examples of the document (contained image information) of the document in the information display apparatus according to the exemplary embodiment of the invention.

DETAILED DESCRIPTION

Figures 3, 4:
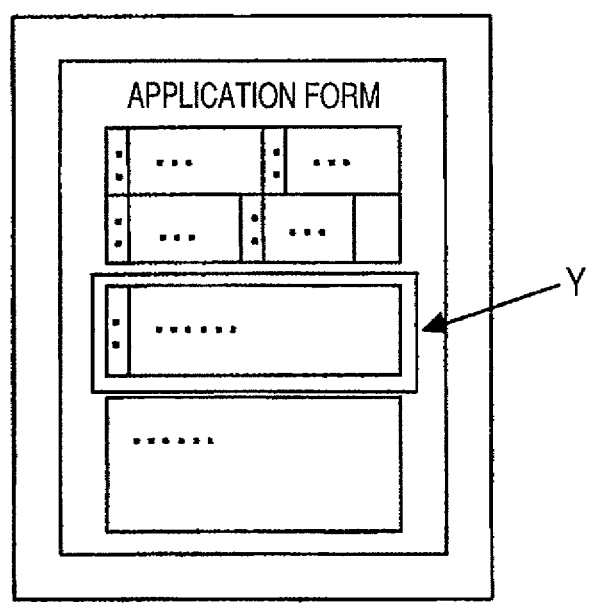
FIG. 3 is an explanatory diagram showing an example of image information cut out from the document by the information display apparatus according to the exemplary embodiment of the invention.
FIG. 4 is an explanatory diagram showing an example of the display of the document by the information display apparatus according to the exemplary embodiment of the invention.

An exemplary embodiment according to the invention will be explained with reference to drawings. As shown in FIG. 1, for example, an information display apparatus 1 according to the exemplary embodiment of the invention is configured to include a control portion 11, a storage portion 12, an operation portion 13 and a display portion 14.

The control portion 11 is a program control device such as a CPU (central processing unit) and operates in accordance with a program stored in the storage portion 12. The control portion 11 acquires image information as a subject of a display processing and performs a scale-up and scale-down processing with a designated magnification as to the image information thus acquired. The size of the image information thus scaled-up/scaled-down is compared with the size of the display area of the display portion 14. When the image information is larger than the display area of the display portion 14 (that is, the longitudinal portion or the vertical portion of the image information extrudes from the display area), a processing for differentiating the magnitude between the longitudinal direction and the vertical direction of the image information is performed to thereby house and display the entirety of the image information within the display area. This processing of the control portion 11 will be explained in detail.

The storage portion 12 includes a storage device such as a RAM (random access memory). The program executed by the control portion 11 is stored in the storage portion 12. The program may be provided in a manner of being stored in a computer readable storage medium such as a DVD-ROM (digital versatile disc-read only memory) and copied to the storage portion 12. Further, the storage portion 12 operates also as the work memory of the control portion 11.

The operation portion 13 is configured by ten keys or arrow keys, for example, which accepts the operation of a user and outputs the contents of the operation to the control portion 11. The display portion 14 is configured by a liquid crystal display etc. In this embodiment, it is supposed that the size of the display area of the display portion 14 is set in advance. Hereinafter, the size will be shown as Pw×Ph. The display portion 14 displays the image information in accordance with the instruction inputted from the control portion 11.

Next, the explanation will be made as to the information display processing performed by the control portion 11. In this embodiment, the information display apparatus 1 accepts the image of a document including image information to be processed. The control portion 11 specifies the image information contained in the image of the document. As shown in FIG. 2, for example, the document is configured by a form forming a plurality of blank spaces and characters etc. written into the spaces.

The control portion 11 defines an area where significant pixels (pixels represented by pixel values at corner portions etc. of the image of the document, except for a base color) continue and extracts as a rectangle area a circumscribed rectangle which circumscribes the area where the significant pixels continue. Since the processing of detecting a portion where the significant pixels continue and the processing of defining a rectangle circumscribing the portion are well known, the detailed explanation thereof will be omitted.

According to these processings, the control portion 11 records, in an association manner, information for discriminating the respective circumscribed rectangles (circumscribed rectangle discriminating information) and coordinate information (for example, a left upper corner coordinate and a right lower corner coordinate) for defining each of the rectangles discriminated by the circumscribed rectangle discriminating information.

The control portion 11 checks whether or not each of the circumscribed rectangles is contained in another circumscribed rectangle. For example, supposing that the left upper corner coordinate and the right lower corner coordinate of a noticed circumscribed rectangle N are (Pnlt x, Pnlt y) and (Pnrb x, Pnrb y), respectively, if there is recorded a circumscribed rectangle X relating to coordinate information such as Pxlt x<Pnlt x, Pxlt y<Pnlt y, Pxrb x>Pnrb x and Pxrb y>Pnrb y (in this case, for example, the left upper corner of the document is set as an origin, then the height direction (lower direction) of the document is set as the positive direction of a Y-axis and the width direction (right direction) of the document is set as the positive direction of an X-axis), it is determined that the noticed circumscribed rectangle N is contained within the another circumscribed rectangle X. The control portion 11 erases circumscribed rectangles each having a size smaller than threshold values set in advance (a size smaller than preset values in width and height) among the circumscribed rectangles contained within the another circumscribed rectangle X. This processing prevents that a circumscribed rectangle having a relatively small size configured by respective characters (or constituent elements of characters such as a voiced consonant mark) of a character sequence is taken out, and further this processing takes out a circumscribed rectangle which circumscribes to the image portions of the respective cells of a table. Thus, the threshold values of the size are set to be at least two characters or more of an average character, for example.

The control portion 11 performs this processing as to each of the circumscribed rectangles and generates a list of the circumscribed rectangles which are determined not to be erased (the circumscribed rectangles each not contained within the another circumscribed rectangle). Partial images within the respective circumscribed rectangles which are determined not to be erased among the images of the document are extracted as image information to be processed.

Thus, with respect to the document shown in FIG. 2, for example, the image information contained in each of a plurality of the circumscribed rectangles shown in FIG. 3 is extracted.

The control portion 11 starts a processing for displaying the image of the document on the display portion 14. In this processing, the control portion 11 performs the scale-up and scale-down processing of the image of the document so that, for example, at first the entirety of the image of the document is displayed within the display area of the display portion 14. For example, when the size of the image of the document is Dw in its width and Dh in its height, the control portion calculates rw=Pw/Dw and rh=Ph/Dh and sets a smaller one of rw and rh as a scale-up and scale-down ratio Rc, and scales-up or scales-down (scale-up and scale-down processing) the entire image of the document with the scale-up and scale-down ratio Rc. In this case, each of a scale-up and scale-down ratio Rx in the X-axis direction and a scale-up and scale-down ratio Ry in the Y-axis direction is set to be the scale-up and scale-down ratio Rc.

Thus, the image of the document is displayed on the entirety of the display area of the display portion 14 (FIG. 4). Then, the control portion 11 sets one of the image information thus extracted (at first, one of the image information may be selected in accordance with a predetermined condition and thereafter may be selected in accordance with a user's instruction) as selected image information, and performs a display processing for discriminating the selected image information (Y in FIG. 4). The display processing for discriminating can be realized by such a processing of drawing a frame line of the circumscribed rectangle of the selected image information by a predetermined color.

Figure 5:
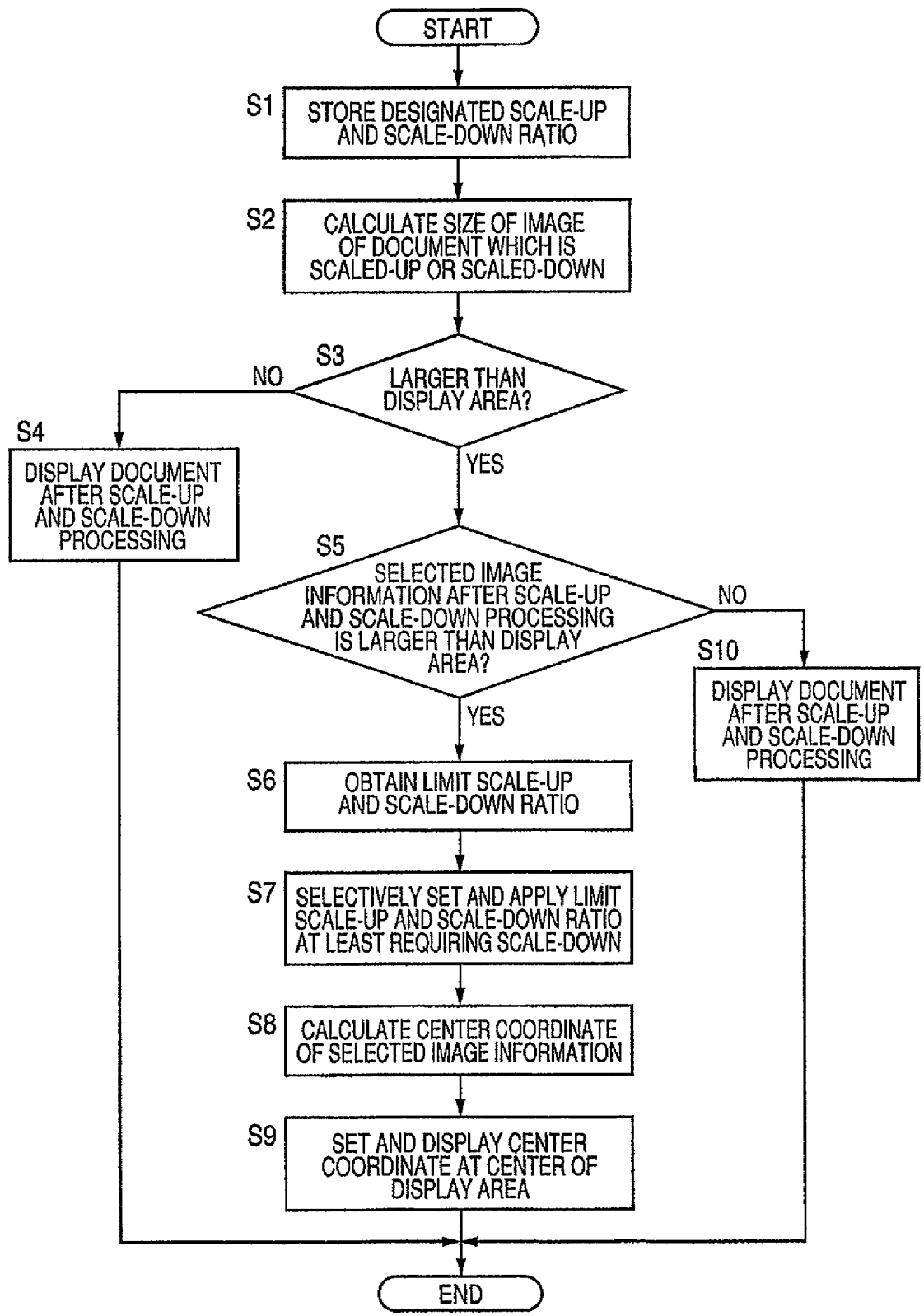
FIG. 5 is a flow chart showing an example of the processing performed by the information display apparatus according to the exemplary embodiment of the invention.

The control portion 11 starts a processing shown in FIG. 5 in response to an instruction of scaling-up or scaling-down the contents being displayed. That is, the control portion 11 sets the scale-up and scale-down ratio in accordance with an instruction of a user. Supposing that the current scale-up and scale-down ratio is R (Rx in the X-axis direction and Ry in the Y-axis direction), when a user instructs the scale-up processing, the scale-up and scale-down ratios Rx and Ry are made larger by adding a predetermined value ΔR to each of Rx and Ry, for example. In contrast, when a user instructs the scale-down processing, the scale-up and scale-down ratios Rx and Ry are made smaller by subtracting the predetermined value ΔR from each of Rx and Ry, for example Further, in this case, when the scale-up and scale-down ratios Rx and Ry thus changed after the subtracting or adding processing of AR etc. is smaller than a predetermined lower limit value Rmin, each of the scale-up and scale-down ratios Rx and Ry may be set to Rmin. Similarly, when the scale-up and scale-down ratios Rx and Ry thus changed is larger than a predetermined upper limit value Rmax, each of the scale-up and scale-down ratios Rx and Ry may be set to Rmax. That is, in this embodiment, in the case of changing the scale-up and scale-down ratios in accordance with the designation of a user, the scale-up and scale-down ratios in the X-axis direction and the Y-axis direction are set to be equal to each other (that is, the same magnification in the vertical and transverse directions).

When the scale-up and scale-down ratio is changed in this manner, the control portion 11 starts the processing shown in FIG. 5 and at first stores the scale-up and scale-down ratio thus designated by a user to the storage portion 12 as a designated scale-up and scale-down ratio (S1).

Then, the control portion 11 calculates a size of the image of the document which is scaled-up or scaled-down by the scale-up and scale-down ratios Rx and Ry having been changed (S2). In this case, the image of the document has a size of Dw×Rx in the X-axis direction and Dh×Ry in the Y-axis direction. The control portion 11 checks whether or not the size after the scale-up and scale-down processing is larger than the display area, that is, Dw×Rx>Pw or Dh×Ry>Ph (S3).

When the size after the scale-up and scale-down processing is determined to be smaller than the display area, the control portion 11 continues to display the entire image of the document after the scale-up and scale-down processing on the display area of the display portion 14 (S4).

On the other hand, when the size after the scale-up and scale-down processing is determined to be larger than the display area in the processing of S3, the control portion 11 determines whether or not the size of the area of the selected image information after the scale-up and scale-down processing is larger than the display area (S5). For example, when the left upper corner coordinate and the right lower corner coordinate of the area of the selected image information before the scale-up and scale-down processing are (Pnlt x, Pnlt y) and (Pnrb x, Pnrb y), respectively, it is determined whether or not Rx·(Pnrb x−Pnlt x)>Pw or Ry·(Pnrb y−Pnlt y)>Ph.

When the size of the area of the selected image information after the scale-up and scale-down processing is determined to be larger than the display area of the display portion 14

(Rx·(Pnrb x−Pnlt x)>Pw or Ry·(Pnrb y−Pnlt y)>Ph), the control portion 11 acquires the scale-up and scale-down ratio (hereinafter called a limit scale-up and scale-down ratio) by which the size of the area of the selected image information after the scale-up and scale-down processing is within the display area (S6). The limit scale-up and scale-down ratio is ρx=Pw/(Pnrb x−Pnlt x) in the X-axis direction and ρy=Ph/(Pnrb y−Pnlt y) in the Y-axis direction, for example.

The control portion 11 selects one of ρx and ρy which is at least smaller than "1" (that is, one requiring the scale-down) and applies the selected scale-up and scale-down ratio to the corresponding axis direction (S7). That is, the control portion 11 sets the selected scale-up and scale-down ratio as the scale-up and scale-down ratio of the corresponding axis direction. For example, when ρx is smaller than "1", Rx is set to be ρx. In contrast, when ρy is smaller than "1", Ry is set to be ρy.

The control portion 11 acquires the center coordinate of the area of the selected image information (S8). When the left upper corner coordinate and the right lower corner coordinate of this area before the scale-up and scale-down processing are (Pnlt x, Pnlt y) and (Pnrb x, Pnrb y), respectively, the center coordinate is (Rx·(Pnlt x+Pnrb x)/2, (Ry·(Pnlt y+Pnrb y)/2). The control portion 11 controls the display area so that the calculated center coordinate locates at the center of the display area of the display portion 14 (S9). That is, of the image of the document after the scale-up and scale-down processing, an area of the coordinate vales from (Rx·(Pnlt x+Pnrb x)/2−Pw/2, Ry·(Pnlt y+Pnrb y)/2−Ph/2) to (Rx·(Pnlt x+Pnrb x)/2+Pw/2, Ry·(Pnlt y+Pnrb y)/2+Ph/2) is displayed.

In this case, when a ratio of the width and the height of the area of the selected image information differs from a ratio of the width and the height of the display area of the display portion 14, Rx and Ry differ to each other. However, also in this case, as described above, the control portion 11 executes again the scale-up and scale-down processing by differentiating the magnitude between the longitudinal direction and the vertical direction of the selected image information to thereby perform the adjustment so that the entirety of the selected image information is displayed within the display area.

The display mode is not limited to the aforesaid example, and the control portion 11 may perform the following processing in the processing S9. For example, the control portion 11 extracts, from the image of the document, the circumscribed rectangle as the portion of the selected image information, then subjects the entirety of the image of the document to the scale-up and scale-down processing by the designated scale-up and scale-down ratio (the scale-up and scale-down ratio stored in the processing S1) to thereby control the display range of the document image and display the document image in a manner that the center coordinate of the range of the selected image information locates at the center portion of the display area of the display portion 14. Further, the control portion 11 subjects the extracted selected image information to the scale-up and scale-down processing by the scale-up and scale-down ratios of the respective axes acquired in the processing S7 and overwrites the image of the selected image information acquired by the scale-up and scale-down processing on the displayed document image in a manner that the displayed document image acts as a background. The selected image information is composed with the document image so that the center coordinate of the selected image information subjected to the -up/scale-down processing locates at the center of the display area.

Figure 6:
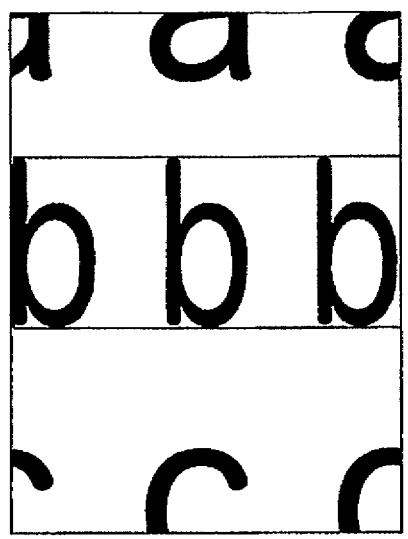
FIG. 6 is an explanatory diagram showing an example of the display of the information display apparatus according to the exemplary embodiment of the invention.

According to this example, as shown in FIG. 6 as an example, the selected image information is composed with the document image which is subjected to the -up/scale-down processing by the designated scale-up and scale-down ratio and acts as the background in a manner that only the selected image information is subjected to the scale-up and scale-down processing by the adjusted scale-up and scale-down ratios which are different from the designated scale-up and scale-down ratio and are adjusted so that the entirety of the selected image information is displayed on the display portion 14. Thus, in FIG. 6, although the entirety of the selected image information is displayed within the display area, other image portions of the same size (portions displayed in adjacent thereto in the upper and lower directions in FIG. 6) extrude partially from the display area.

Further, in the processing S5, when the size of the region of the selected image information after the scale-up and scale-down processing is not larger than the display area of the display portion 14, the control portion 11 may display the entirety of the document image after the scale-up and scale-down processing on than the display area of the display portion 14 (S10) and terminate the processings.

In the aforesaid processing S7, the control portion 11 may also select the scale-up and scale-down ratio equal to or more than "1" to thereby set the ratios as follows.

$$Rx=\rho x$$

$$Ry=\rho y$$

When the ratios are set in this manner, the selected image information is enlarged in the width and height directions and so can be displayed on the entirety of the display area. The control portion 11 stores the scale-up and scale-down ratios Rx, Ry in the respective axis directions thus calculated in the storage portion 12.

Further, the control portion 11 switches the selected image information in response to the instruction from a user. As an example, the control portion 11 stores the respective image information thus extracted in the storage portion 12 in association with serial numbers in the order of the smaller one of the Y-axis coordinate values of the left corner coordinates of the respective image information (when there are a plurality of areas of the same coordinate value in the Y-axis direction, in the order of the smaller one of the X-axis coordinate values).

Then, the control portion 11 at first sets the image information relating to the minimum serial number as the selected image information. Thereafter, when a user instructs by using the arrow keys etc. that the next image information is to be set as the selected image information, the serial number related to the image information currently being selected is added with "1". Then, the image information relating to the new serial number thus acquired by adding "1" to the current serial number is set as the selected image information. In contrast, when a user instructs by using the arrow keys etc. that the just before image information is to be set as the selected image information, "1" is subtracted from the serial number related to the image information currently being selected. Then, the image information relating to the new serial number thus acquired by subtracting "1" from the current serial number is set as the selected image information When the selected image information is switched in this manner, the control portion 11 may execute the processing S2 and the succeeding processings. In this case, the scale-up and scale-down ratios Rx, Ry calculated based on the selected image information before the switching are also applied to the selected image information after the switching.

Further, when the selected image information is switched, the control portion 11 may read the information of the designated scale-up and scale-down ratio stored in the storage portion 12, then set the scale-up and scale-down ratio to the designated scale-up and scale-down ratio and execute the processing S2 and the succeeding processings. In this case, so long as the entirety of the selected image information after the switching can be displayed on the display area of the display portion 14 even if the designated scale-up and scale-down ratio of a user is applied with a higher priority to thereby scale-up or scale-down the selected image information after the switching by the designated scale-up and scale-down ratio, the selected image information after the switching is displayed with the designated scale-up and scale-down ratio (as explained above, the scale-up and scale-down ratio is same in the vertical and transverse directions).

Further, the control portion 11 may perform the following processing in the processing S5 of FIG. 5. That is, when the selected image information after the scale-up and scale-down processing is larger than the display area, that is, when Rx·(Pnrb x−Pnlt x)>Pw or Ry·(Pnrb y−Pnlt y)>Ph, the control portion 11 checks whether or not the selected image information after the scale-up and scale-down processing protrudes from the display area even in a state that the selected image information is rotated by 90 degrees. That is, it is checked whether or not Rx·(Pnrb x−Pnlt x)>Ph or Ry·(Pnrb y−Pnlt y)>Pw.

Then, when Rx·(Pnrb x−Pnlt x) is not larger than Ph and Ry·(Pnrb y−Pnlt y) is not larger than Pw, the document image may be subjected to the scale-up and scale-down processing by the designated scale-up and scale-down ratio, then rotate the document image after the scale-up and scale-down processing may be rotated by 90 degrees and displayed on the display portion 14. In this case, the display position may be controlled so that the center coordinate of the selected image information coincides with the center of the display area.

Further, in this case, when Rx·(Pnrb x−Pnlt x)>Pw or Ry·(Pnrb y−Pnlt y)>Ph and also Rx·(Pnrb x−Pnlt x)>Ph or Ry·(Pnrb y−Pnlt y)>Pw, since the selected image information after the scale-up and scale-down processing protrudes from the display area even if the selected image information is rotated by 90 degrees, the control portion 11 proceeds to the processing S6 and the succeeding processings to continue the processings.

The embodiment has the aforesaid configuration and operates in the following manner. The information display apparatus 1 according to the embodiment acquires the document image including at least one image information. In this case, it is supposed that the information display apparatus 1 acquires the document shown in FIG. 2 as an example. The information display apparatus 1 defines an area where significant pixels continue and detects a circumscribed rectangle which circumscribes the defined area. Further, when there is a circumscribed rectangle which is contained in another circumscribed rectangle among the detected the circumscribed rectangles, the information display apparatus 1 excludes the circumscribed rectangle contained in the another circumscribed rectangle from the detected the circumscribed rectangles.

In this manner, the information display apparatus 1 determines at least one circumscribed rectangle which is not contained in another circumscribed rectangle. Then, the information display apparatus 1 extracts the portion of the document image within each of the circumscribed rectangles thus determined as the image information.

The information display apparatus 1 selects one of the respective image information thus extracted as the selected image information. This selection may be performed in a manner that the image information located at the uppermost portion of the document image is selected as the selected image information, for example.

Figure 7A:
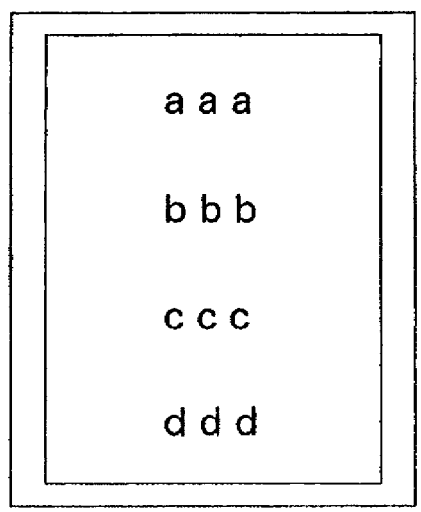
FIGS. 7A to 7D are explanatory diagrams showing examples of the display of the information display apparatus according to the exemplary embodiment of the invention.

Further, the information display apparatus 1 determines an initial scale-up and scale-down ratio according to a predetermined method. This initial scale-up and scale-down ratio may be selected in a manner that, for example, the scale-up and scale-down ratio capable of displaying the entirety of the document image in the display area of the display portion 14 is selected among predetermined choices. As an example, supposing that the width and the height of the document image are D and Dh, and the width and the height of the display area are Pw and Ph, respectively, Rmin=min [Dw/Pw, Dh/Ph] is calculated and the maximum choice equal to or less than Rmin among the predetermined choices (for example, 4%, 14%, 28%, - - - , 94%, 100%, - - - , 144%, - - - ) may be set as the initial scale-up and scale-down ratio The information display apparatus 1 subjects the entirety of the document image to the scale-up and scale-down processing by using the initial scale-up and scale-down ratio and displays the image after the scale-up and scale-down processing in the display area of the display portion 14 (FIG. 7(A)).

Then, the information display apparatus 1 accepts the instruction for changing the scale-up and scale-down ratio from a user. In response to the instruction of the user, the scale-up and scale-down ratio may be incremented or decremented stepwise by a predetermined value. Alternatively, in response to the instruction of the user, a next scale-up and scale-down ratio larger than the current ratio (when the user operates to increase the scale-up and scale-down ratio) or a next scale-up and scale-down ratio smaller than the current ratio (when the user operates to reduce the scale-up and scale-down ratio) may be selected from the aforesaid predetermined choices.

The information display apparatus 1 scales-up or scales-down the entirety of the document image by the scale-up and scale-down ratio thus changed and displays the image after the scale-up and scale-down processing on the display area of the display portion 14. In this case, the information display apparatus 1 checks whether or not the image after the scale-up and scale-down processing protrudes from the display area. When it is determined that the image does not protrude from the display area, the image after the scale-up and scale-down processing is displayed on the display area of the display portion 14.

Figure 7B:
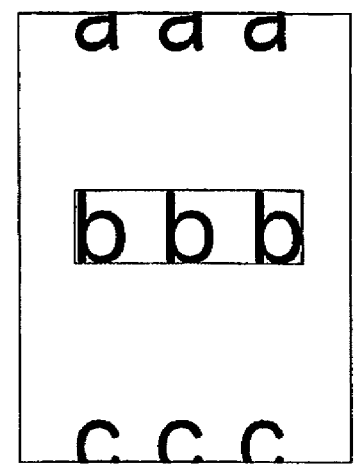

In contrast, when it is determined that the image protrudes from the display area, it is further checked whether or not the selected image information protrudes from the display area. When the selected image information does not protrude from the display area, the document image (including the selected image information) is displayed in a manner that the display area of the selected image information on the document image is set so that the center of the selected image information locates at the center of the display area (FIG. 7(B)). In this case, the scale-up and scale-down ratio is the predetermined scale-up and scale-down ratio, and the scale-up and scale-down ratio in the vertical (Y-axis) direction and the scale-up and scale-down ratio in the transverse (X-axis) direction are set to be same.

Figure 7C:
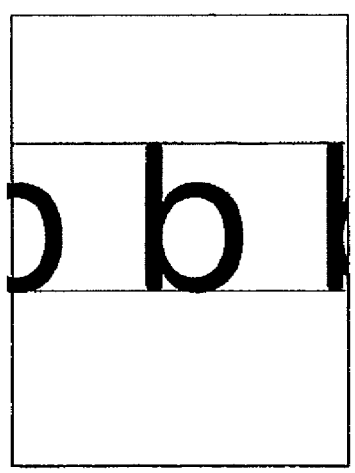
Figure 7D:
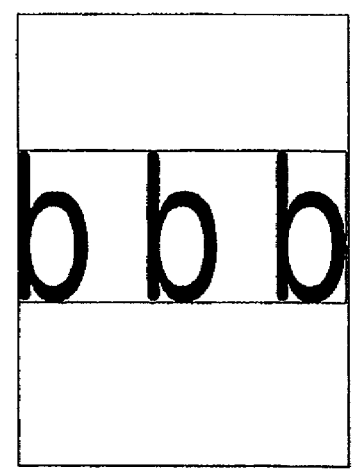

When the selected image information is determined to protrude from the display area, the information display apparatus 1 calculates the width W (W=Prb x−Plt x, where the left upper corner coordinate of the circumscribed rectangle corresponding to the selected image information is (Plt x, Plt y) and the right lower corner coordinate thereof is (Prb x, Prb y)) and the height H (H=Prb y−Plt y) of the selected image information Then, the information display apparatus 1 calculates the scale-up and scale-down ratios ρx=Pw/W and ρy=Ph/H in the respective axis directions by using the width Pw and the height Ph of the display area, and selects the scale-up and scale-down ratio of the X or Y-axis direction which is smaller than "1". FIG. 7(C) shows an example where the selected image information protrudes in the X-axis direction. In this example, ρx calculated in the aforesaid method is smaller than "1" but ρy calculated in the aforesaid method is not smaller than "1". Thus, the information display apparatus 1 selects ρx and changes the scale-up and scale-down ratio Rx corresponding to this selected scale-up and scale-down ratio among the current scale-up and scale-down ratios Rx and Ry in the X and Y-axis directions to the selected ρx (that is, Rx=ρx). The scale-up and scale-down ratio Ry not corresponding to the selected scale-up and scale-down ratio is remained to be the designated scale-up and scale-down ratio. The information display apparatus 1 subjects the document image (including the selected image information) to the scale-up and scale-down processing by the scale-up and scale-down ratios Rx and Ry in the respective axis directions to deform the document image to thereby display on the display area of the display portion 14. In this case, the display area of the selected image information on the document image is set so that the center of the selected image information locates at the center of the display area (FIG. 7(D)). According to this case, although Rx and Ry do not coincide to each other (the scale-up and scale-down ratios differ in the respective directions), the entirety of the selected image information can be displayed within the display area.

In the aforesaid description, although it is explained that the ratio between Rx and Ry after the changing may take any value (that is, Rx/Ry or Ry/Rx may take any value) at the time of differentiating the scale-up and scale-down ratios Rx and Ry in the respective axis directions in order to display the entirety of the selected image information, the ratio may be limited. For example, the information display apparatus 1 may check whether or not Rx/Ry after the changing is within a predetermined limit range. When the ratio is not within the limit range, the scale-up and scale-down ratio having been changed may be restored to the ratio before the changing, then the document image may be subjected to the scale-up and scale-down ratio processing by the restored scale-up and scale-down ratio and displayed. In this case, although a part of the selected image information is displayed in a protruded manner, information representing this state (a character sequence such as "there is a part of the information is not displayed) may be displayed together with the selected image information.

Further, for example, when one of Rx and Ry is changed, if Rx/Ry after the changing is not within the predetermined limit range, the other of these scale-up and scale-down ratios not having been changed may be changed in a range capable of displaying the entirety of the selected image information to thereby determine whether or not Rx/Ry after the changing can be set within the predetermined limit range. When it is determined to be yes, the other of these scale-up and scale-down ratios not having been changed may be changed to a value which is in a range capable of displaying the entirety of the selected image information and capable of setting Rx/Ry after the changing to be within the predetermined limit range to thereby subject the document image to the scale-up and scale-down processing by the scale-up and scale-down ratios after the changing to deform and display the document image.

Further, the limit value of the magnification ratio such as Rx/Ry may be determined at every kind of the selected image information. In this case, the information display apparatus 1 determines as to by which one of characters, a line drawing and a picture (bit map image), the selected image information is formed, based on the values of the pixels and the density of the significant pixels etc. contained in the selected image information. Since the known method can be used as this determining method, the detailed explanation thereof will be omitted.

Then, the information display apparatus 1 may determine whether or not the magnification ratio is within the limit range by using the corresponding one of limit ranges which are separately determined in advance for characters, a line drawing and a picture.

For example, the magnification ratio may be determined to be in a range from 0.5 to 2.0 for characters, from 0.6 to 1.8 for a line drawing and from 0.8 to 1.2 for a picture. In the case where the image information including pixels determined as "a picture" is the selected image information, when the scale-up and scale-down ratio is changed, it is determined whether or not Rx/Ry is within the range from 0.8 to 1.2. When it is determined to be no, the scale-up and scale-down ratio is restored to the designated ratio (the scale-up and scale-down ratio before the changing) to thereby perform the scale-up and scale-down processing of the document image and display the document image. In contrast, when it is determined to be yes, the document image is subjected to the scale-up and scale-down processing by the scale-up and scale-down ratio having been changed and the document image is displayed.

Further, although the aforesaid explanation shows the case where the scale-up and scale-down processing is performed by using the different scale-up and scale-down ratios such as different magnifications in the respective axis directions to thereby display the entirety of the selected image information, the deforming processing is not limited thereto. For example, the information display apparatus 1 may perform the scale-up and scale-down processing of the image information by using non-uniform scale-up and scale-down ratios for the respective parts of the image information to thereby deform the image so that the entirety of the image information is displayed on the display area.

As shown in FIG. 8, the scale-up and scale-down processing by using non-uniform scale-up and scale-down ratios for the respective parts may be (A) where the scale-up and scale-down ratio becomes smaller toward the peripheral portion in one axis direction or (B) where a deforming processing is performed so as to form an image acquired through a fish-eye lens, for example. FIG. 8 shows examples where a meshed pattern image is subjected to the deforming processing so as to be understood easily. Further, the image may be deformed by using the technique of Seam Curving (Avidan, S. and Shamir. A., 2007, Seam Carving for Content-Aware Image Resizing, ACM Trans. Graph. 26, 3 (July 2007), 10, DOI=http://doi.acm.org/10.1145/1276377.1276390).

Figure 9:
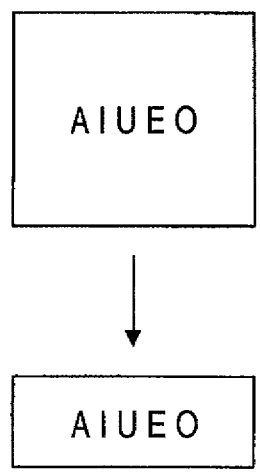
FIG. 9 is an explanatory diagram showing another modified example of the document (contained image information) of the document in the information display apparatus according to the exemplary embodiment of the invention.

According to the Seam Curving, a path of a low energy (or entropy, that is, a characteristic value capable of being calculated based on pixel values according to a predetermined method) continuing to each direction being subjected to the scale-up and scale-down processing is detected. In the case of scaling down, the path is deleted. In contrast, in the case of scaling up, the path is copied and disposed to an adjacent position to enlarge the image information. According to this method, since a path having a relatively small changing value is deleted, for example, as shown in FIG. 9, a portion including meaningful pixels such as a character among the significant pixels is kept at the same magnification, but a portion not containing meaningful pixels is deleted and changed in its magnification ratio.

In this embodiment, the processing of the control portion 11 may be performed not by the information display apparatus 1 but by a not-shown server in a manner that the information display apparatus 1 receives the result of the processing of the server and the information display apparatus 1 performs the succeeding processings.

For example, the information display apparatus 1 may transmit the designated scale-up and scale-down ratio, the size of the display area and information (URL etc.) for specifying a document to be displayed etc. to the server. Then, the server may execute the processings except for the display processings such as the processings S4 and S9 shown in FIG. 5. Then, the information display apparatus 1 may receive information of the image (including information of the center coordinate etc.) as a subject to be displayed from the server and display the document after the scale-up and scale-down processing or display a received image in which the center coordinate is set as the center of the display area.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A non-transitory computer-readable medium having embodied thereon a program which, when executed by a computer, causes the computer to execute a method of displaying a portion of an image displayed on a display, the method comprising:
   receiving a first input of a user to select the portion of the image;
   receiving a second input of a user to display the portion;
   in response to receiving the second input, scaling a size of the selected portion of the image to one of a height and a width of the display and centering the scaled, selected portion on the display, wherein a height and a width of the selected portion are changed in different ratios respectively so that a ratio between the width and the height of the selected portion is within a predetermined range, and the predetermined range is determined according to a type of the selected portion which includes a character, a line drawing, and a picture;
   determining whether the ratio between the width and height of the scaled, selected portion is within the predetermined range;
   receiving a scaling ratio; and
   scaling the size of the selected portion by the scaling ratio, in response to determining that the ratio between the width and the height of the scaled, selected portion is not within the predetermined range.

2. The non-transitory computer-readable medium according to claim 1, wherein the portion is less than the entire image.

3. The non-transitory computer-readable medium according to claim 2, wherein the image comprises text and a picture, and
   wherein the portion comprises the picture.

4. The non-transitory computer-readable medium according to claim 3, wherein the scaling comprises changing a size of the picture, and
   wherein the centering comprises translating the scaled picture to a center of the display.

5. The non-transitory computer-readable medium according to claim 4, wherein the centering comprises positioning a coordinate at a center of the scaled picture at a center of the display.

6. The information display apparatus according to claim 4, wherein the centering comprises positioning a coordinate at a center of the scaled picture at a center of the display.

7. The non-transitory computer-readable medium according to claim 1, wherein the centering comprises displaying the scaled, selected portion to form a certain image acquired through a fish-eye lens.

8. The non-transitory computer-readable medium according to claim 1, wherein the centering comprises displaying the scaled, selected portion to form a certain image acquired by using a technique of Seam Curving.

9. An information display apparatus comprising:
   a display that displays an image;
   an acquiring unit that receives a first input of a user to select a portion of the image displayed on the display and a second input of a user to display the portion; and
   a processing unit that, in response to the acquiring unit receiving the second input, scales a size of the selected portion of the image to one of a height and a width of the display and centers the scaled, selected portion on the display,
   wherein a height and a width of the selected portion are changed in different ratios respectively so that a ratio between the width and the height of the selected portion is within a predetermined range, and the predetermined range is determined according to a type of the selected portion which includes a character, a line drawing, and a picture,
   wherein the processing unit determines whether the ratio between the width and height of the scaled, selected portion is within the predetermined range, and
   wherein the processing unit receives a scaling ratio, and scales the size of the selected portion by the scaling ratio, in response to determining that the ratio between the width and the height of the scaled, selected portion is not within the predetermined range.

10. The information display apparatus according to claim 9, wherein the portion is less than the entire image.

11. The information display apparatus according to claim 10, wherein the image comprises text and a picture, and
    wherein the portion comprises the picture.

12. The information display apparatus according to claim 11, wherein the scaling comprises changing a size of the picture, and
    wherein the centering comprises translating the scaled picture to a center of the display.

13. The information display apparatus according to claim 9, wherein the processing unit controls the scaled, selected portion to form on the display a certain image acquired through a fish-eye lens.

14. The information display apparatus according to claim 9, wherein the processing unit controls the scaled, selected portion to form on the display a certain image acquired by using a technique of Seam Curving.

* * * * *